United States Patent [19]
Graham et al.

[11] Patent Number: 5,821,284
[45] Date of Patent: Oct. 13, 1998

[54] DURABLE MOTOR INSULATION

[75] Inventors: Mark Graham, Folsom; Lane Levi, Rescue; Brett Clarke, Plymouth, all of Calif.

[73] Assignee: The United States of America as represented by the Secretary of the Air Force, Washington, D.C.

[21] Appl. No.: 549,079

[22] Filed: Oct. 27, 1995

[51] Int. Cl.$^6$ ...................................................... C08K 7/00
[52] U.S. Cl. .......................... 523/179; 523/138; 524/409; 524/423; 524/606
[58] Field of Search ..................... 524/409, 423, 524/606, 184; 523/179, 156, 155, 138

[56] References Cited

U.S. PATENT DOCUMENTS

| | | | |
|---|---|---|---|
| 2,935,471 | 5/1960 | Aarons et al. | 524/419 |
| 3,094,511 | 6/1963 | Hill et al. | 524/606 |
| 3,565,835 | 2/1971 | Weber et al. | 524/419 |
| 4,001,126 | 1/1977 | Marion et al. | 252/62 |
| 4,034,676 | 7/1977 | Daume | 102/103 |
| 4,219,452 | 8/1980 | Littlefield | 523/156 |
| 4,244,847 | 1/1981 | Posiviata et al. | 524/606 |
| 4,373,038 | 2/1983 | Moraw et al. | 523/156 |
| 4,492,779 | 1/1985 | Junior et al. | 523/179 |
| 4,600,732 | 7/1986 | Junior et al. | 523/179 |
| 4,878,431 | 11/1989 | Herring | 102/290 |
| 4,956,397 | 9/1990 | Rogowski et al. | 523/179 |
| 5,007,343 | 4/1991 | Marks | 102/290 |
| 5,498,649 | 3/1996 | Guillot | 524/606 |

FOREIGN PATENT DOCUMENTS

| | | |
|---|---|---|
| 3314842 | 10/1984 | Germany . |
| 1603123 | 11/1981 | United Kingdom . |

*Primary Examiner*—Veronica P. Hoke
*Attorney, Agent, or Firm*—Thomas C. Stover

[57] ABSTRACT

Provided is an insulation for rocket motors that uses two ingredients not previously combined in such insulation before. These ingredients are ammonium sulfate and antimony oxide, which when combined, have a synergistic effect that reduces the ablation rate significantly. Such insulation also includes EPDM rubber and aramid fibers. The inventive insulation also exhibits better tear resistance and propellant-to-insulation bond peel strength, compared with prior art rocket motor insulation.

5 Claims, 3 Drawing Sheets

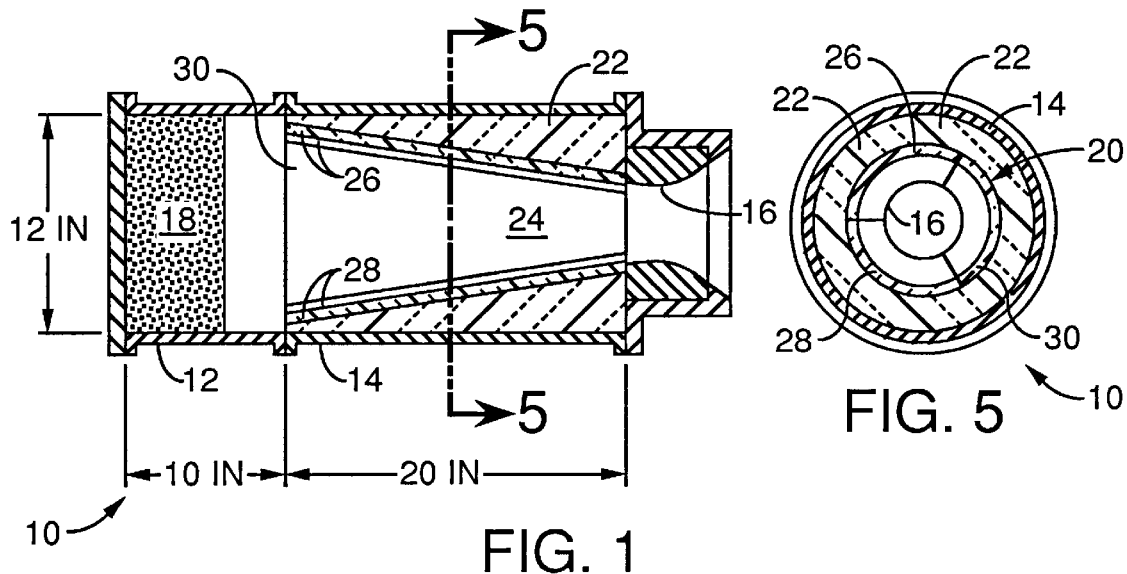
FIG. 1
FIG. 5
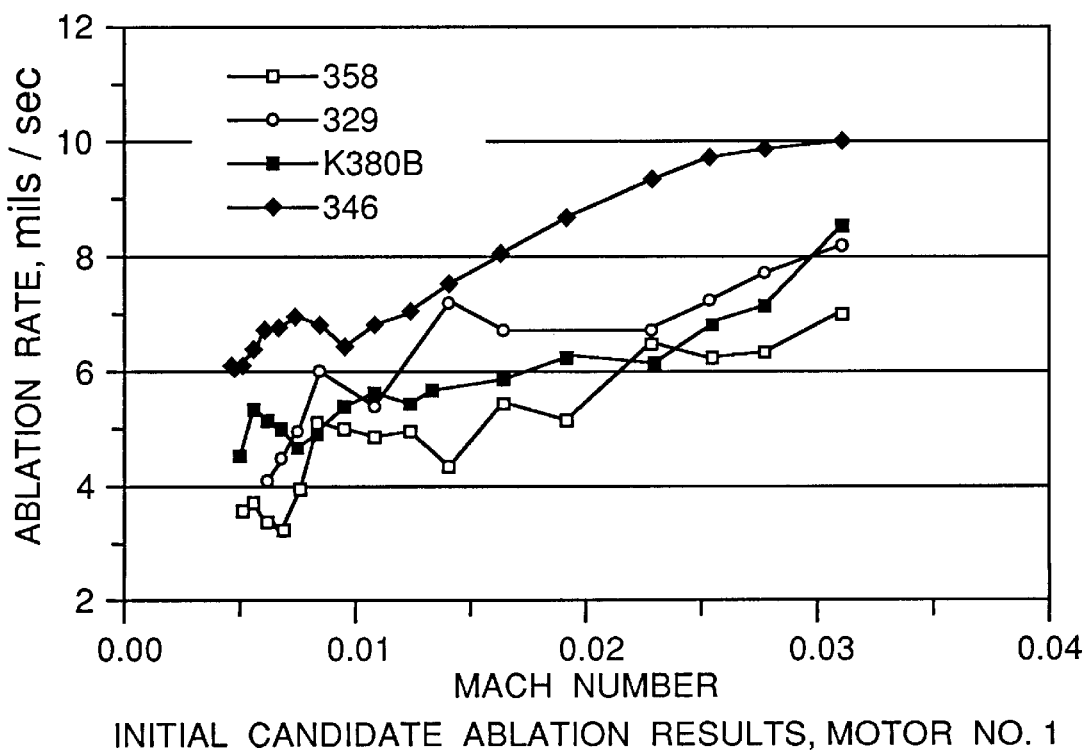
INITIAL CANDIDATE ABLATION RESULTS, MOTOR NO. 1
FIG. 2

INITIAL CANDIDATE ABLATION RESULTS, MOTOR NO. 2

K380B ABLATION COMPARISON

DURABLE MOTOR INSULATION

STATEMENT OF GOVERNMENT INTEREST

The invention described herein may be manufactured and used by or for the Government for governmental purposes without the payment of any royalty thereon.

FIELD OF THE INVENTION

This invention relates to durable motor insulation particularly durable rocket motor internal insulation.

BACKGROUND OF THE INVENTION

Current state of the art rocket motor insulations use several key ingredients in combination. There are two types of rocket motor insulations, 1) fiber-filled and 2) non fiber-filled. The fiber-filled typically contain aramid (5–20 wt. %) fibers, chlorinated hydrocarbons metal oxides and rubber ingredients. To obtain low ablation rates, these formulations use high levels of fiber and chlorinated compounds, e.g. 10–25 wt % for each. Such high levels of these ingredients give materials very high moduli and low elongation, severely limiting their structural applications. They are also limited in fabrication as they usually have to be tape-wrapped. This eliminates them from use in smaller, tactical motors.

A typical prior art non fiber-filled insulation is designated herein as K380B. This type of insulation also includes rubber ingredients and is much more forgiving structurally than fiber filled formulations. However, such insulation does not perform as well ablatively and, because it is sulfur cured, it requires a liner to bond consistently with propellant. The sulfur curative, while providing tear resistance to the non-fiber filled insulation, comes with harmful cure by-products which interfere with obtaining a good bond with propellant and thus the need for the above noted liner.

The above fiber-filled insulation employs metal oxides (as the ablative fillers) as noted above. Metal oxides in combination with halogen-containing compounds are widely used in elastomers to inhibit flammability. The metal oxide reacts with the halogens in gas phase reactions by forming a volatile metal tri-halide.

In contrast with the above fiber filled insulation, K380B uses the endothermic properties of ammonium salts to slow the build-up of heat at its rubber surface. This favors char forming processes and reduces flammability. However, a design requirement of, e.g. 75% elongation restricts the use of fiber in the formulation to about 2% or less. Typically, 5% or greater is required to have a significant impact on ablation.

Metal oxide insulations are disclosed in U.S. Pat. No. 5,007,343 to Marks and U.S. Pat. No. 4,878,431 to Herring, with the limitations noted above.

Accordingly, it is an object of the invention to provide a rocket motor insulation of improved ablation and tear resistance and/or propellant-to-insulation-bond peel strength.

Thus there is a need and market for an improved insulation for rocket motors that overcomes the above prior art shortcomings.

There has now been discovered a rocket motor insulation of improved ablation and tear resistance that is more versatile in processing and in structual applications.

SUMMARY OF THE INVENTION

Broadly, the present invention provides a rocket motor insulation that employs both $(NH_4)_2SO_4$ and $Sb_2O_3$ and preferably with EDPM and "Kevlar" fibers.

In a preferred embodiment, the invention provides an internal insulation for rocket motors having:

a) 45–50 wt % EPDM, b) 4–6 wt % $Sb_2O_3$, c) 15–18 wt % $(NH_4)_2SO_4$ and d) ½–1 wt % of "Kevlar" fibers.

By "EPDM" as used herein, is meant a rubber compound of ethylene-propylene diene terpolymer which can be HMW EPDM or LWM EPDM as further discussed below.

By "Kevlar" as used herein, is meant aramids, which can come in fibers, including staples, e.g. 0.10 to 0.50 in. long and 10 to 14 microns in diameter.

BRIEF DESCRIPTION OF THE DRAWINGS

The invention will become more apparent from the following detailed specification and drawings in which:

FIG. 1 is a sectional elevation schematic view of rocket motor insulation embodying the present invention, FIGS. 2, 3 and 4 are performance graphs of several rocket motor insulations which measure ablation rate in mils/sec v. Mach number, FIG. 5 is a cross-sectional elevation view of the motor of FIG. 1, taken on lines 5—5, looking in the direction of the arrows

DESCRIPTION OF PREFERRED EMBODIMENTS

Figure 3:
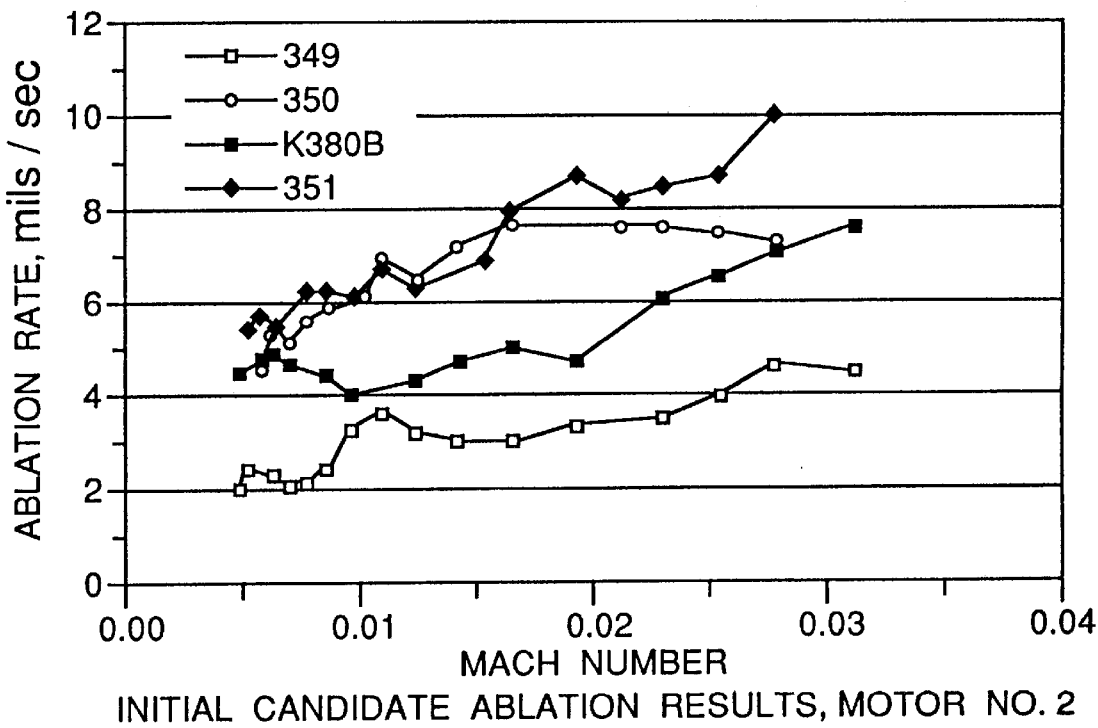

Referring in more detail to the drawings, test rocket motor 10 having housing components 12 and 14 and nozzle 16, is shown in FIGS. 1 and 5. The housing 12 contains 40 lb. grain propellant 18, insulation material 20, inert backup material 22 and conical discharge zone 24, as shown in FIG. 1. The insulation material is divided into a K380B control sector and one or more candidate insulation materials 26, 28 and 30, as shown in FIG. 5.

Figure 6:
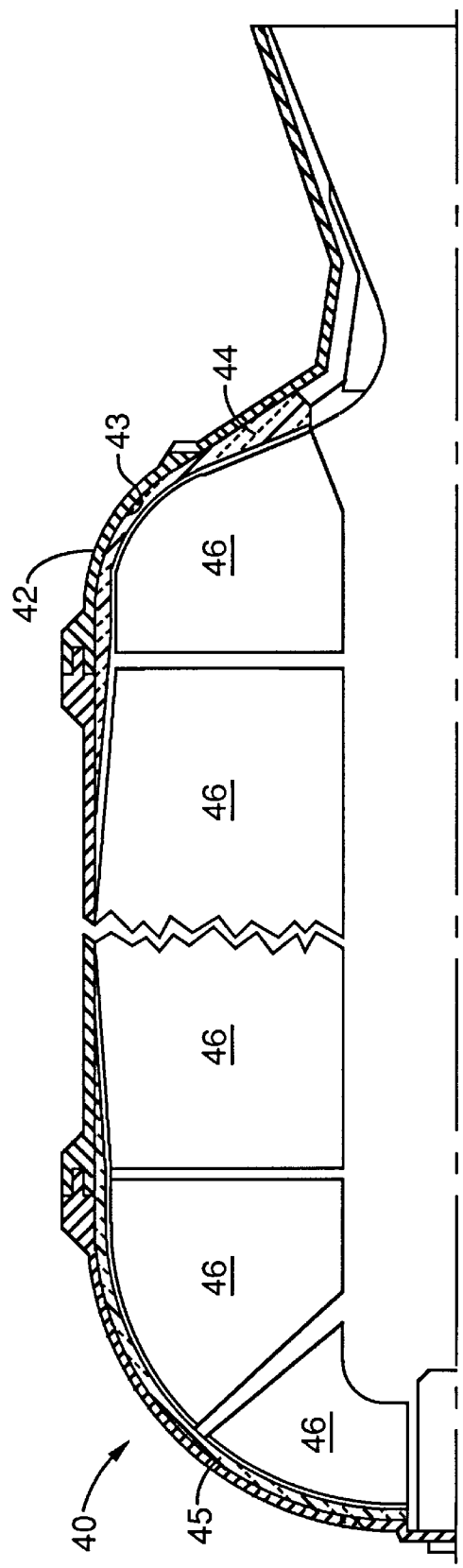
FIG. 6 is a partial sectional elevation schematic view of another embodiment of rocket motor insulation per the present invention.

In a working rocket 40 of the invention, housing 42 has insulation 44 mounted therein and propellant 46 mounted to the insulation, as shown in FIG. 6. As the fuel burns off, the insulation 44 is subject to ablation but protects the underlying housing wall 43 from ablation and wear.

As indicated above, an objective of developing the present invention was to provide a new internal insulation formulation that had relatively high peel strength to rocket propellant. Another objective was to replace the sulfur curative system with a peroxide system, evaluate alternatives to ammonium salts as the ablative filler and remove non essential ingredients. Removing the sulfur-curative was a main priority so as to eliminate harmful cure by-products which interfere with obtaining a good bond with propellant as noted above.

In view of the above objectives, various replacement materials were evaluated. Once replacement materials were selected, they were mixed in 2-lb. batches and tested and compared to K380B as the baseline.

Accordingly, six formulations, as shown in Table 1 below, were tested using two 12" diameter test motors, such as illustrated in FIGS. 1 and 5. Each motor included a grain propellant loaded with approximately 40 lb. of small rocket propellant and an insulation test section that contained K380B and three candidate insulative formulations. Test motor parameters were selected to obtain ablation rates comparable to full scale motors, at 4 to 9 mils/sec (off insulation thickness). Action time and chamber pressure averaged 14 seconds and 1075 psia respectively, for the two motors. Two of the six formulations out-performed K380B. Formulation 358, which contained 20 wt. % Dechlorane 515 and 5 wt. % $Sb_2O_3$, was an average of 15% better (in sample thickness retention or ablation resistance) than K380B while Formlulation 349 which contained 17.5 wt. % $(NH_4)_2SO_4$ and 5 wt. % $Sb_2O_3$ out-performed K380B by an average of 65% (in sample thickness retention). The results are shown graphically over a range of Mach numbers in FIGS. 2 and 3. Based on these results, only Formulations 358 and 349 were kept for further development.

TABLE I

TEST SAMPLES FORMULATION COMPARISON

| Rubber Ingredients (PHR) | K380B Control | 346 | 349 | 329 | 350 | 351 | 358 |
|---|---|---|---|---|---|---|---|
| Nordel | 100 | 80 | 80 | 100 | 100 | 70 | 70 |
| Trilene 65 | — | 20 | 20 | — | — | 30 | 30 |
| N330 | 5 | — | — | — | — | — | — |
| N990 | — | 1 | 1 | 1 | 1 | 1 | 1 |
| HiSil 233 | 40 | 40 | 35 | 35 | 38 | 42.5 | 40 |
| Wingtack | 7.5 | 10 | 10 | 10 | 10 | 10 | 10 |
| Agerite Resin D | 1 | — | — | — | — | — | — |
| TEA | 2 | — | — | — | — | — | — |
| Stearic Acid | 1 | — | — | — | — | — | — |
| Zinc Oxide | 5 | 5 | 5 | 5 | 5 | 5 | 5 |
| Carbowax 3350 (PEG) | — | 2.5 | 2.5 | 2 | 2 | 2 | 2 |
| Chlorowax LV | 10 | — | — | — | — | — | — |
| MgO | 2 | — | — | — | — | — | — |
| $Sb_2O_3$ | — | — | 10 | 10 | 5 | 10 | 10 |
| Dechlorane 515 | — | — | — | 20 | 10 | 20 | 40 |
| Kevlar Staples | — | — | — | — | — | — | — |
| $(NH_4)_2SO_4$ | 35 | 35 | 35 | — | — | — | — |
| TAC | — | 1 | 1 | 1 | 1 | 1 | 1 |
| Vulcup 40KE | — | 6 | 6 | 6 | 6 | 6 | 6 |
| Sulfur | 1.75 | — | — | — | — | — | — |
| Captax | 2.50 | — | — | — | — | — | — |

The ingredients in Table I above and Table II below, are more fully described in the following list.

Rocket Motor Insulation Rubber Formulation Ingredients

Nordel 2522—Ethylene-Propyltne-Diene Terpolymer (EPDM) Termonomer—1,4 Hexadiene; Viscosity 25(ML 1+4@121° C.)

Trilene 65—Ethylene-Propylene-Diene Terpolymer (Liquid EPDM) Termonomer—Dicyclopentadiene; Avg. MW-6500

N330—Carbon black, 26–30 μm; N990—Carbon black, 201–500 μm

HiSil 233—Precipitated, hydrated amorphous silica; Particle size-0.019 μm

Wingtack 95—Hydrocarbon Resin

AgeRite Resin D—Polymerized 1,2-dihydro-2,2,4 trimethylquinoline

TEA—Triethanol Amine

Stearic Acid—Octadecanoic acid

Zinc Oxide—ZnO

Carbowax 3350—Polyethylene Glycol; MW-3350

Chlorowax LV—Chlorinated Parafin

MgO—Magnesium Oxide $Sb_2O_3$—Antimony Oxide

Dechlorane 515—Chlorinated cyclic alaphatic hydrocarbons

Kevlar Staples—Aramid fiber, 0.25" lng×12 μm dia., 1.44 g/cc

Ammonium Sulfate—$(NH_4)_2SO_4$, 40–80 μm particle size

TAC—Triallyl cyanurate

Vulcup 40KE—1,4-bis(tertbutylperoxy-isopropyl) benzene on Burgess KE clay

Sulfur—Elemental Sulfur flowers

Captax—2-mercaptobenzothiazole

Table I above, the units are to be read as follows. One starts with 100 parts (by wt.) of EPDM (first two items) and adds the remaining ingredients per the parts listed above. Table II, below, is to be read in the same manner.

RM-468 resulted from the further development of RM-349. The main difference was the addition of 0.85 wt % Kevlar fibers to improve tear strength. RM-468 was also tested against K380B using the 12 inch ablation test motor. The results show RM-468 outperforming K380B by an average of 56% (in sample thickness retention or ablation resistance) and are shown graphically in FIG. 4.

The conclusion from the ablation testing is that there is a synergistic effect from combining $(NH_4)_2SO_4$ with $Sb_2O_3$ that outperforms even the current state-of-the art, Dechlorane 515 (cyclic chlorinated hydrocarbons) with $Sb_2O_3$.

RM-468 insulation is unusual among rocket motor insulations in that it used two ingredients that have not been combined in an insulation before. The two ingredients Ammonium Sulfate $(NH_4)_2SO_4$ and Antimony Oxide $(Sb_2O_3)$ when combined, have a synergistic effect that reduces ablation rates significantly. An important novelty lies in the combination of these two ingredients in an insulation formulation.

RM-468 is a rubber insulation material that is compounded by mixing together high and low molecular weight ethylene-propylene diene terpolymer (EPDM) with hydrated silica, hydrocarbon resin, ablative fillers and a peroxide curative system (e.g. T-Butyl peroxide) in a high shear mixer. RM-468 has been successfully die molded, gas autoclave cured and extruded into insulation parts which have been incorporated into a solid rocket motor chamber. Table II compares the formulation, physical and rheometric properties of RM-468 with those of the baseline K380B.

TABLE II

COMPARISON OF K380B WITH RM-468

| Rubber Ingredients (PHR)* | K380B Control | RM-468 |
|---|---|---|
| Nordel | 100 | 85 |
| Trilene 65 | — | 15 |
| N330 | 5 | 1 |
| N990 | — | — |
| HiSil 233 | 40 | 37.5 |
| Wingtack | 7.5 | 10 |
| Agerite Resin D | 1 | — |
| TEA | 2 | — |
| Stearic Acid | 1 | — |
| Zinc Oxide | 5 | 5 |
| Carbowax 3350 (PEG) | — | 2 |
| Chlorowax LV | 10 | — |
| MgO | 2 | — |
| $Sb_2O_3$ | — | 10 |
| Dechlorane 515 | — | — |
| Kevlar Staples | — | 1.75 |
| $(NH_4)_2SO_4$ | 35 | 35 |

TABLE II-continued

COMPARISON OF K380B WITH RM-468

| Rubber Ingredients (PHR)* | K380B Control | RM-468 |
|---|---|---|
| TAC | — | 1 |
| Vulcup 40KE | — | 4 |
| Sulfur | 1.75 | — |
| Captax | 2.50 | — |
| Physical Properties | | |
| Tensile, psi | 1156 | 1011 |
| Elongation, % | 940 | 630 |
| Modulus at 200% Elong, psi | 218 | 465 |
| Durometer | 62 | 73 |
| Specific Gravity | 1.17 | 1.18 |
| Rheometric Properties | | |
| Minimum Viscosity | 10 | 10 |
| Delta 5, min | 1.85 | 1.40 |
| Maximum Torque | 80 | 84 |
| Mooney Viscosity | 62 | 72 |

D18/1.30
*per hundred parts of rubber

Figure 4:
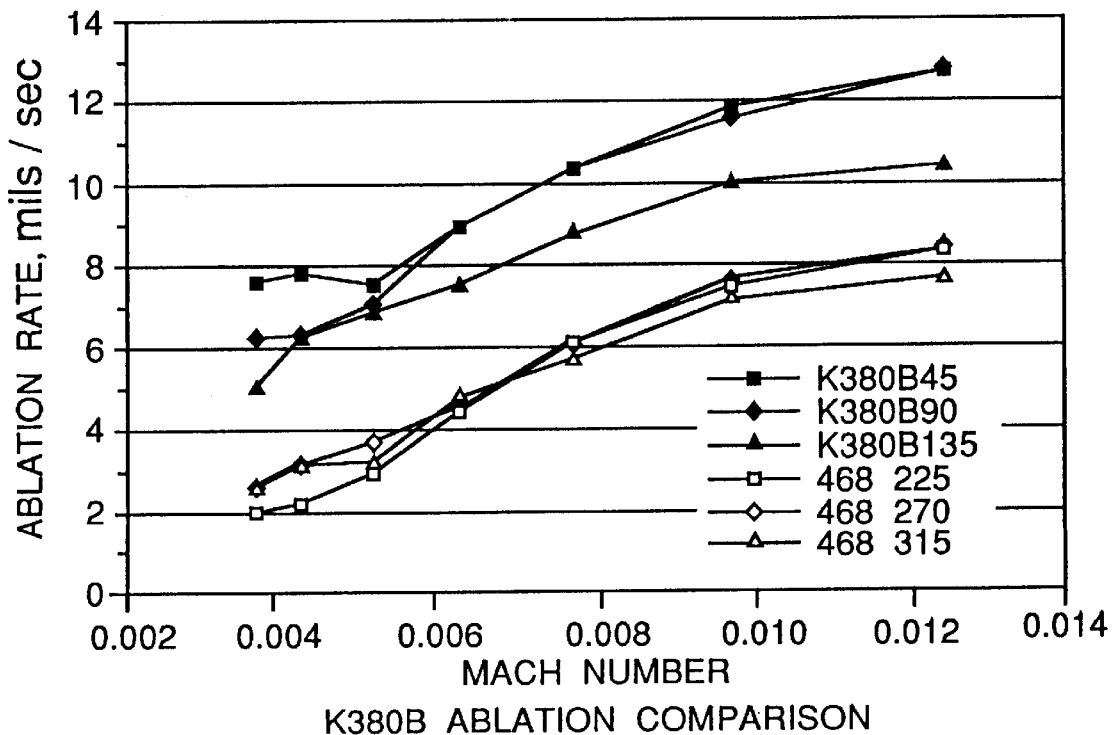

The rocket motor insulation of the invention (RM-468) was found to be of low ablation rate as shown in FIG. 4. This is an important property of the inventive insulation.

The inventive insulation also was found to be of high tear strength due to the addition of fibers therein, e.g. 134–153 pli, of high Mooney values, e.g. 83–98; of high tensile strength, e.g. 1343 to 1405 psi; of good elongation, e.g. 430 to 450% and of good shrink resistance, e.g. 1.06 to 1.21%. These values were significantly higher than for the baseline sample of K380B.

Also the inventive insulation (e.g. sections 44 and 45), shown in FIG. 6, has a significantly better bond peel strength, in most tests, to the propellant 46 than the baseline insulation, as indicated in Table III below.

batch to batch. RM-468 has been extruded through a spider mold, vacuum bagged and autoclave cured and been die molded, into six full-scale insulative boots (e.g. sections 44 and 45, as shown in FIG. 6). A complete insulation set (of boots) has been successfully processed into a full-scale small ICBM chamber. Ablation performance has been characterized in two separate subscale motor firings over one year apart. Propellant bond properties have been obtained by casting three separate full-scale propellant batches on die molded boots and testing hundreds of peel, tensile and high rate shear bond samples. RM-468 has also been successfully bonded to aluminum, K380B, itself and graphite case material.

Further RM-468, the inventive insulation, has been found to process more easily and mold better parts than the baseline insulation. The degree of improvement was so great that changing to the inventive insulation is expected to reduce the cost of insulation in a rocket motor by about 10%.

Accordingly, the present invention provides a new rocket motor internal insulation that shows improvement over present non-aramid fiber insulators used in the prior art. Formulation RM-468 uses a unique combination of ingredients to improve the performance of insulation in several critical areas. These areas include ablation and tear resistance, processing, propellant and (if needed) liner compatibility, cure and physical properties and moldability.

As noted above, prior art rocket motor insulations are typically the fiber-filled type or the nonfiber-filled type, e.g. K380B. As indicated above, RM-468 is an improvement over both types of insulators. Its ablation performance is comparable to fiber filled formulations, while it is much more versatile structurally and in processing. When compared to K380B, RM-468 has much better ablation resistance, is easier to process and depending on the application, does not require the extra weight of liner to bond with propellant.

Formulation RM-468 has successfully combined several key ingredients to achieve an internal insulation rocket

TABLE III propellant/insulation bond of insulators

| | K380B | | | RM-468 | |
|---|---|---|---|---|---|
| Sample ID No. | Peel Strength, pli | | Failure Mode | Peel Strength, pli | | Failure Mode |
| 1 | 8.5 | 9.3 | CPI | 18.4 | 14.4 | CP |
| 2 | 2.6 | 3.6 | CPI | 14.4 | 14.7 | CP |
| 3 | 11.9 | 11.7 | CP | 19.8 | 16.8 | CP |
| 4 | 4.1 | 3.9 | CPI | 18.3 | 16.1 | CP |
| 5 | 12.1 | 11.0 | CPI | 14.0 | 13.1 | CP |
| 6 | 15.2 | 15.5 | CP | 14.8 | 16.8 | CP |
| 7 | 11.0 | 10.7 | CP | 14.2 | 14.4 | CP |
| 8 | 11.7 | 12.3 | CP | 17.6 | 14.4 | CP |
| 9 | 11.7 | 11.1 | CPI | 18.4 | 13.7 | CP |
| 10 | 9.3 | 8.6 | CPI | 17.1 | 16.0 | CP |
| 11 | 12.6 | 12.7 | CP | 19.4 | 18.3 | CP |
| 12 | 10.9 | 13.5 | CP | 15.0 | 14.5 | CP |
| 13 | 11.9 | 12.2 | CP | 15.1 | 12.8 | CP |
| 14 | 3.1 | 3.3 | CPI | 14.2 | 14.3 | CP |
| 15 | 11.2 | 12.2 | CP | 12.3 | 10.7 | CP |
| 16 | 6.6 | 7.4 | CPI | 12.5 | 14.3 | CP |

All Reported Peel Strength Values Are at Initial Failure. For Failure Mode, CP Is the Desired Mode and Refers to Cohesive in the Propellant. CPI Refers to Cohesive in the Propellant but Close to the Interface.

During its development, RM-468 insulation has been prepared from lab scale 2 lb batches to full-scale 150 lb batches. The physical properties have been consistent from material with improved ablation characteristics and consistently high propellant bond peel strength. RM-468 has verified that a synergistic effect between $(NH_4)_2SO_4$ and $SB_2O_3$ can significantly reduce ablation rates for internal insulations.

Further, RM-468 insulation provides a new and unique approach to insulating all sizes and types of rocket motors. Its low ablation rates and improved processability provide a high performance, low cost alternative that can be used in various rocket motor programs.

What is claimed is:

1. Internal insulation for rocket motors comprising:
   a) 45–50 wt. % ethylene-propylene diene terpolymar (EPDM),
   b) 4–6 wt. % $Sb_2O_3$,
   c) 15–18 wt. % $(NH_4)_2SO_4$
   d) ½ to 1 wt. % aramid fibers and
   e) 1–3 wt. % t-butyl peroxide as a curative.

2. The insulation of claim 1 having 18 to 20 wt. % of hydrated silica, or about ½ wt % carbon black as a filler.

3. The insulation of claim 1 wherein said aramid fibers are in the form of staples.

4. The insulation of claim 1 wherein said EPDM is a mixture of high molecular weight and low molecular weight rubber ingredients.

5. A laminate wherein the insulation of claim 1 is bonded directly to rocket propellants in said motor.

* * * * *